United States Patent [19]

Liu

[11] Patent Number: 5,727,680

[45] Date of Patent: Mar. 17, 1998

[54] IMPACT RESISTANT COMPACT DISC TRAY STRUCTURE

[76] Inventor: Tak Lun Liu, 6 Shouson Hill Road, Hong Kong, Hong Kong

[21] Appl. No.: 574,944

[22] Filed: Dec. 19, 1995

[30] Foreign Application Priority Data

Sep. 11, 1995 [GB] United Kingdom ............... 9518526

[51] Int. Cl.$^6$ ............................................. B65D 85/57
[52] U.S. Cl. ................................. 206/308.1; 206/310
[58] Field of Search ........................... 206/309, 310, 206/312, 313, 308.1, 493

[56] References Cited

U.S. PATENT DOCUMENTS

| | | | |
|---|---|---|---|
| 4,793,479 | 12/1988 | Otsuka et al. | 206/310 |
| 5,417,324 | 5/1995 | Joyce et al. | 206/310 |
| 5,494,156 | 2/1996 | Nies | 206/308.1 |

FOREIGN PATENT DOCUMENTS 429195  5/1991  European Pat. Off. ........... 206/308.1

*Primary Examiner*—Jimmy G. Foster
*Attorney, Agent, or Firm*—Hodgson, Russ, Andrews, Woods & Goodyear LLP

[57] ABSTRACT

A tray for holding a compact disc wherein the tray comprises a plate having a central region, an annular array of fingers in the central region for receiving the opening of the compact disc and an impact resistance shield within and below the annular array of fingers for receiving impact forces directed toward the fingers and for distributing the forces to the plate so as to protect the fingers from breakage upon impact. The impact resistance shield comprises a central body portion or core and a plurality of radially outwardly extending arms or tentacles located between adjacent fingers and extending into the plate. During impact the central body portion or core radiates the energy of impact directly outwardly and acts as a buffer for the fingers. The central core has a concave outwardly directed face positioned below the tips of the fingers which allows room for the fingers moving downwardly without hinderance for easy removal of the compact disc. The central core of the shield means can be located above the surface of the plate to allow room for the central region of another tray to fit in and to facilitate stacking of a number of trays.

17 Claims, 7 Drawing Sheets

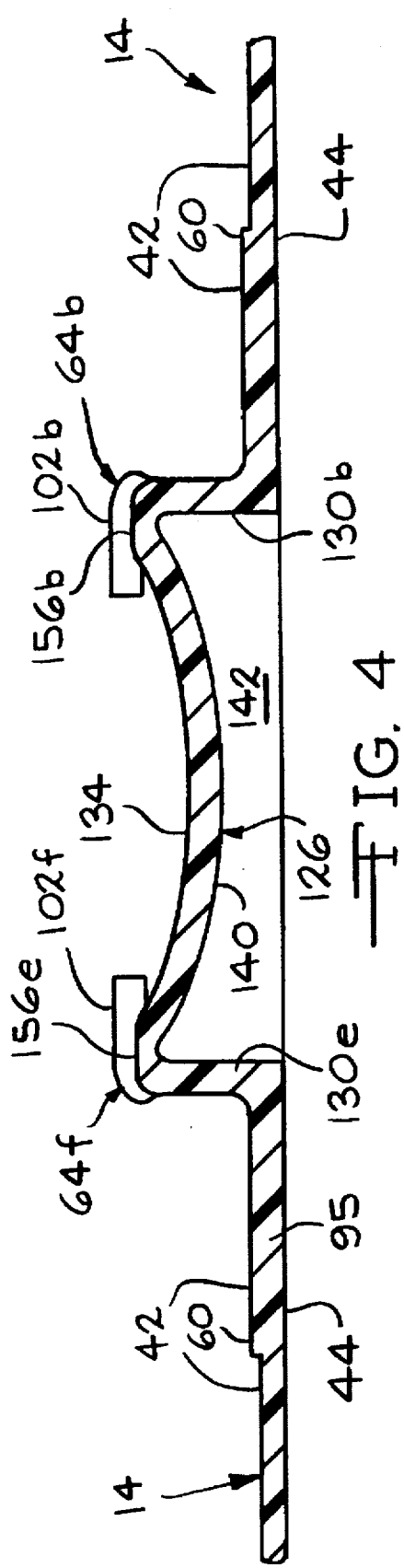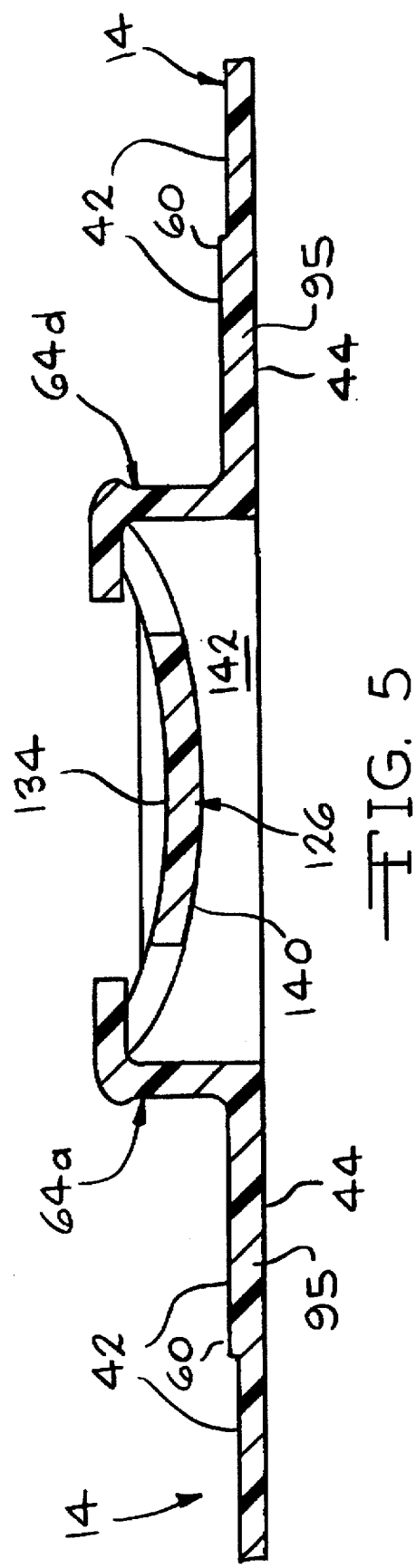

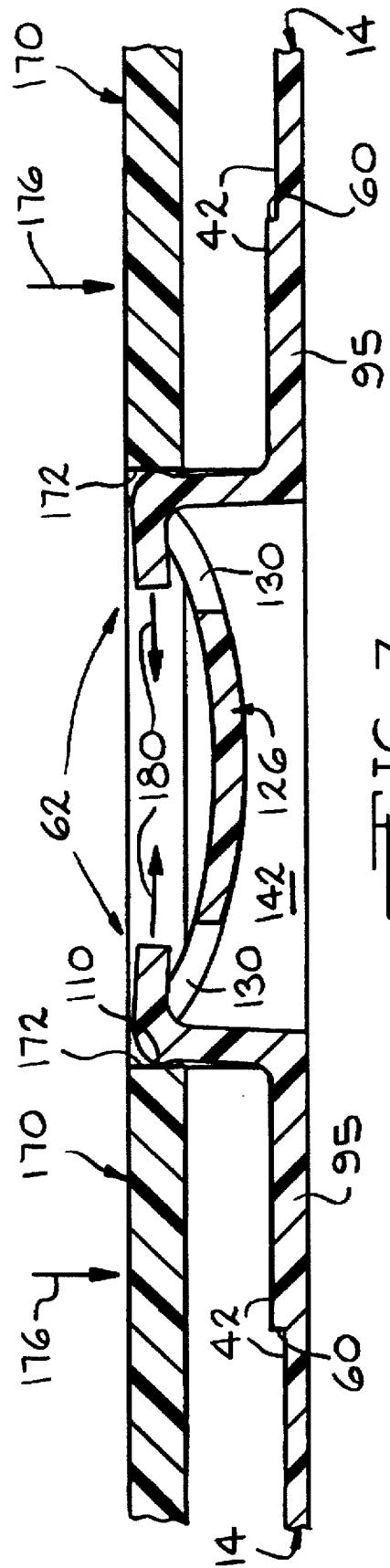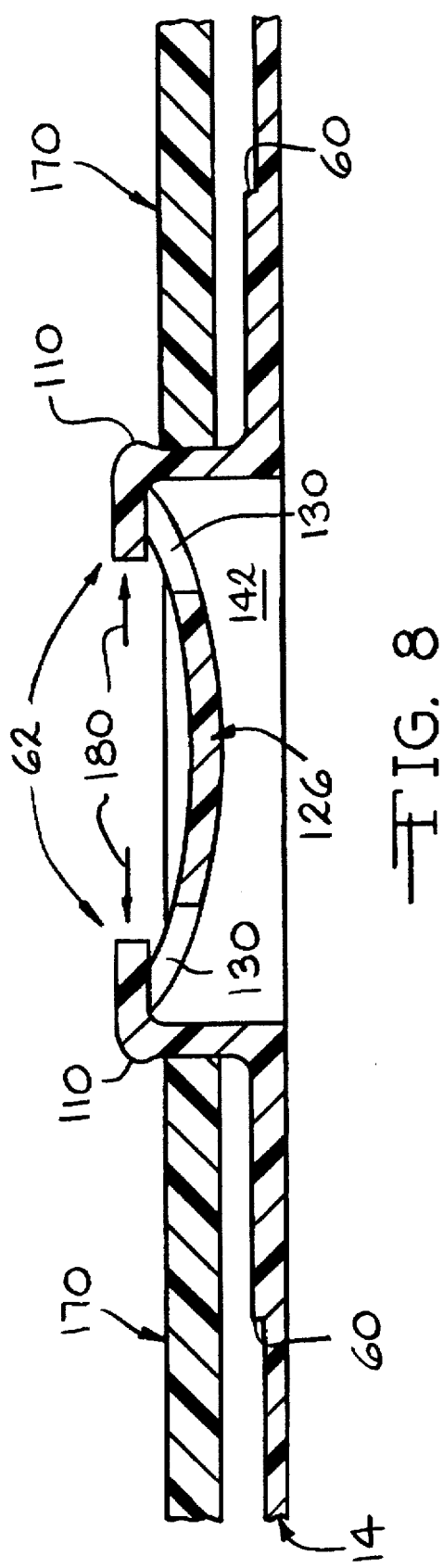

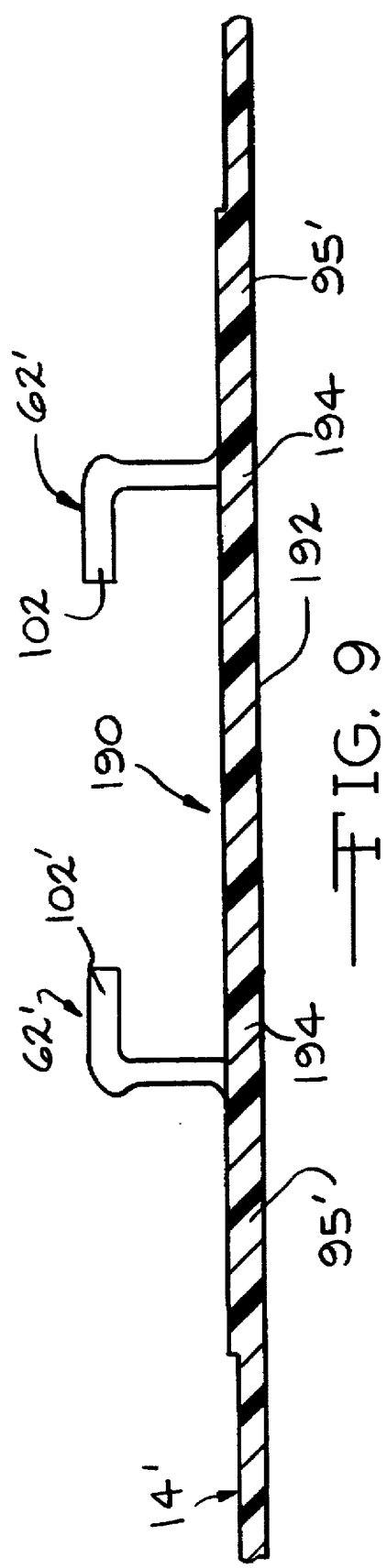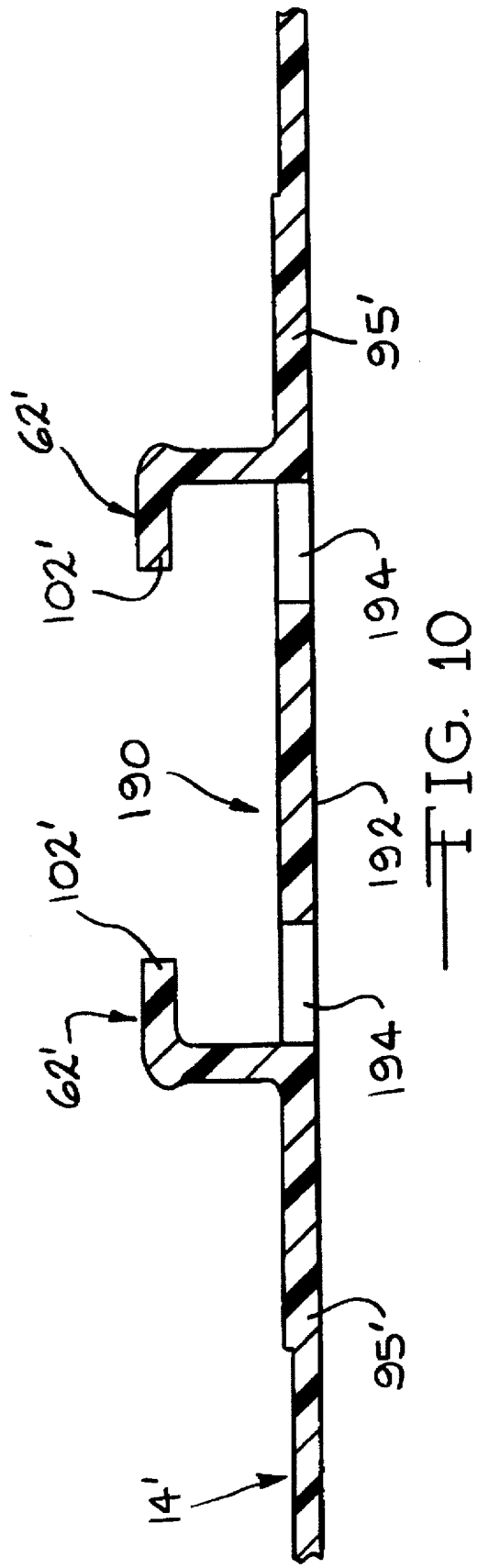

IMPACT RESISTANT COMPACT DISC TRAY STRUCTURE

BACKGROUND OF THE INVENTION

This invention relates to the art of compact disc storage trays, and more particularly to a new and improved impact resistant compact disc tray structure.

Compact discs are plastic circular disc which have recorded digital audio information on spiral tracks formed on a surface of the disc. Such discs typically are stored in a thermoplastic molded protective package having a base and a cover hinged to the base and wherein a plate-like disc storage tray is received in the base. The compact disc is releasably fitted on the tray, and the package cover typically snap-fits onto the base member in a closed position with the tray and disc contained therein.

The disc storage tray has a circular array of inwardly extending cantilevered resilient fingers, each finger having an upstanding portion extending substantially normal to the plate-like body of the tray and an inwardly extending portion disposed substantially parallel to the body of the tray. A shoulder is formed on each finger at the junction of the upstanding and inwardly extending finger portions. The shoulders of the fingers thus are in an annular array. The compact disc has a central opening, and when the disc is fitted on the tray the annular array of shoulders receives the disc central opening in a snug fitting relation. This snug fit resiliently bends the fingers inwardly toward one another so that the disc is firmly held on the tray. When the inwardly extending portions of the fingers are pushed downwardly, the disc can be removed from the tray and be ready for use.

The disc storage tray and the fingers thereof are an integral structure molded of thermoplastic material. In order to provide a clear or transparent tray which is desirable from an appearance standpoint, it is necessary to mold the tray from general purpose polystyrene which is relatively brittle. Accordingly, the fingers are subject to breakage when encountering impact forces such as during mechanized packaging of the trays, dropping of the package or stacking heavy loads on the package during mail handling and the like, as well as during placement and removal of the compact disc on the tray. Previous attempts to solve this problem, such as providing strengthening ribs or similar structures in the plane of the finger tips or finger extensions prevent downward movement of the fingers and thus interfere with easy removal of the compact disc from the tray.

It would, therefore, be highly desirable to provide a compact disc tray structure which is resistant to impact force so as to prevent breakage of the fingers thereof and which does not interfere with easy installation and removal of the compact disc on and from the tray.

SUMMARY OF THE INVENTION

The present invention provides a tray for holding a compact disc wherein the tray comprises a plate having a central region, an annular array of fingers in the central region for receiving the opening of the compact disc and impact resistance shield means within and below the annular array of fingers for receiving impact forces directed toward the fingers and for distributing the forces to the plate so as to protect the fingers from breakage upon impact. The impact resisting shield means comprises a central body portion or core and a plurality of radially outwardly extending arms or tentacles located between adjacent fingers and extending into the plate. During impact the central body portion or core radiates the energy of impact directly outwardly and acts as a buffer for the fingers. The central core has a concave outwardly directed face positioned below the tips of the fingers which allows room for the fingers moving downwardly without hinderance for easy removal of the compact disc. The central core of the shield means preferably is located above the surface of the plate to allow room for the central region of another tray to fit in thereby facilitating stacking of a number on trays together.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 4 is an enlarged, fragmentary sectional view taken about on line 4—4 in FIG. 3;

FIG. 5 is an enlarged fragmentary sectional view taken about on line 5—5 in FIG. 3;

FIGS. 7 and 8 are views similar to FIG. 5 showing the manner in which a compact disc is fitted on the tray structure of the present invention; and FIGS. 9 and 10 are views similar to FIGS. 4 and 5, respectively, illustrating an alternative embodiment of the present invention.

DETAILED DESCRIPTION OF THE ILLUSTRATED EMBODIMENTS

Figure 1:
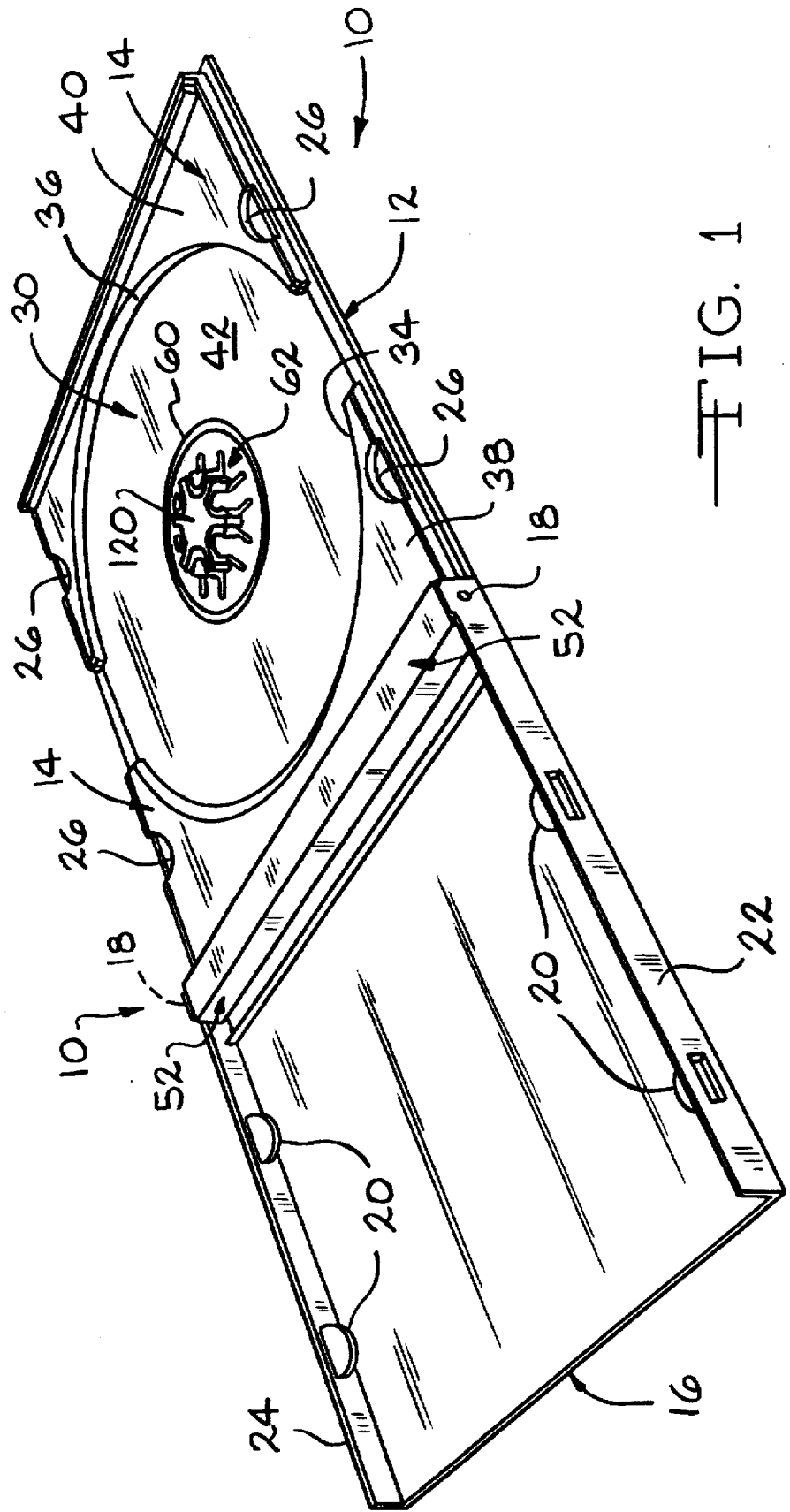
FIG. 1 is a perspective view of a compact disc storage package containing a compact disc tray structure according to the present invention.

Referring first to FIG. 1, there is shown a package 10 for storing a compact disc (not shown in FIG. 1) comprising a rectangular thermoplastic base 12, a rectangular compact disc holding tray 14 which is received in base 12 and a rectangular thermoplastic cover 16 which is hinged at 18 to base 12. The cover 16 snap fits over and to the base 12 to enclose tray 14 in a rectangular cavity formed by base 12 and cover 16. This is facilitated by tabs 20 extending inwardly from sidewalls 22 and 24 of cover 16 which tabs 20 are received in recesses 26 formed in base 12 and tray 14. The package 10 protects the compact disc contained therein from ambient conditions including dust, dirt and excessive handling. The disc comprises information recorded on a spiral digital encoded track formed in one side of a thin circular metal disc substrate encased within a protective relatively thin circular transparent plastic casing in a known manner. The disc is held on tray 14 by means of the central opening in the disc in a manner which will be described in detail presently.

Figure 2:
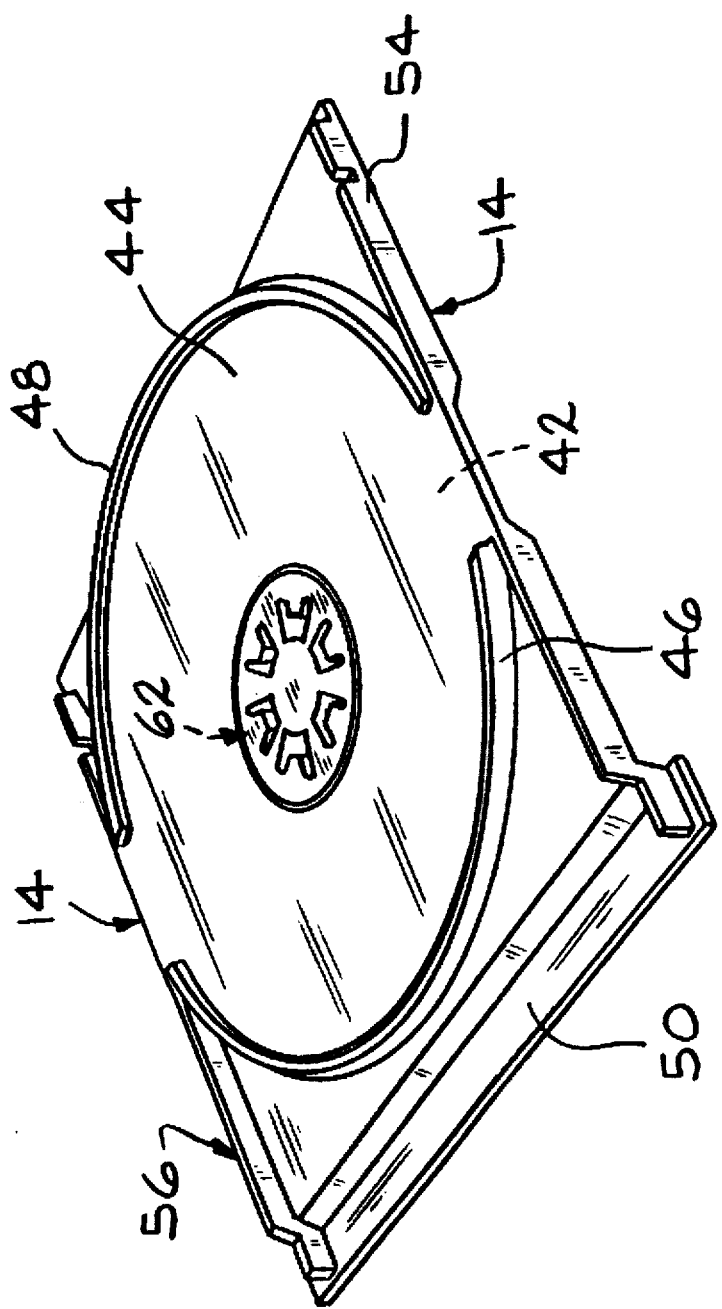
FIG. 2 is a bottom perspective view of the compact disc tray structure included in the package of FIG. 1.

As shown in FIGS. 1 and 2, tray 14 is a rectangular relatively thin plate-like member which conforms to the shape of and is closely received in the rectangular cavity defined by base 12 and cover 16. Tray 14 is formed of molded thermoplastic material such as general purpose polystyrene which is known to be relatively brittle. Tray 14 is planar molded sheet material formed with a circular recess 30 defined by two semi-circular opposing sides 34 and 36 from respective planar surfaces 38 and 40. Recess 30 receives the compact disc and has a planar surface 42. Tray 14 has an oppositely facing planar surface 44, and the two surfaces 42 and 44 define therebetween a thin, plate-like structure. The semi-circular ribs 46 and 48 on surface 44 shown in FIG. 2 serve to support tray 14 in base 12 in a known manner. The offset flange 50 on one end of tray 14 is received within the walled region 52 at the end of base 12 hinged to cover 16 in a known manner. Strengthening ribs 54 and 56 extend along the sides of tray 14.

Figure 3:
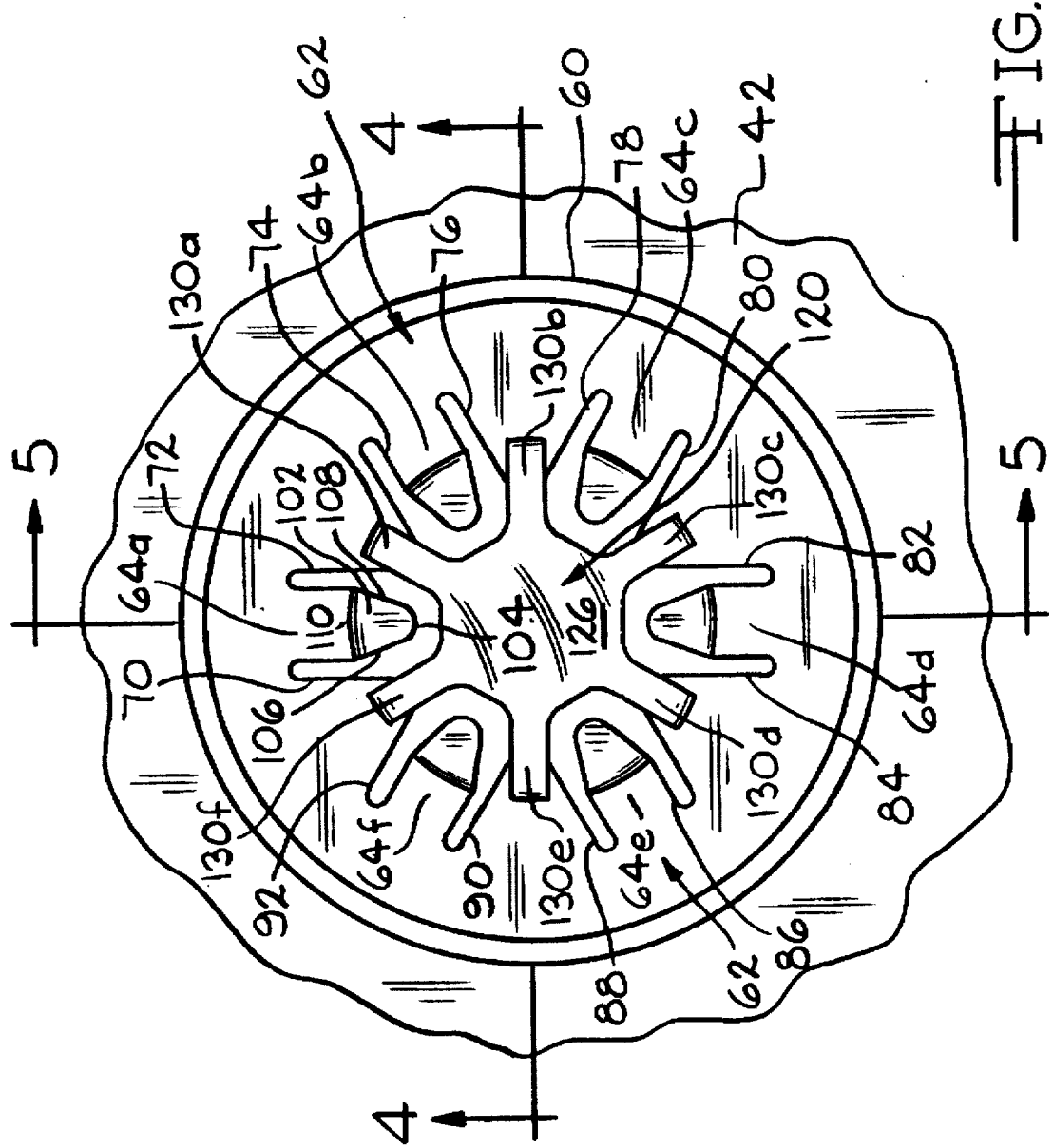
FIG. 3 is a fragmentary enlarged plan view of the compact disc tray structure shown in FIG. 1.

Referring now to FIGS. 1 and 3 an annular step 60 is formed in tray surface 42 which serves to support a compact disc (not shown in FIGS. 1 and 3) held by tray 14 in a manner which will be described in detail presently. Within step 60 there is formed an arrangement 62 of a plurality of fingers 64a–64f in annularly spaced relation relative to the center of the circle defined by step 60 which center serves as a reference point. In the tray 14 of the present illustration there are six equally annularly spaced fingers 64a–64f, but the particular number of fingers is a matter of design choice. Fingers 64a–64f are molded with the remainder of the body of tray 14 and are integral therewith. The fingers 64a–64f are resilient and serve to receive the central opening of a compact disc (not shown in FIGS. 1 and 3) for releasably holding the disc on tray 14 in a manner which will be described.

Figure 6:
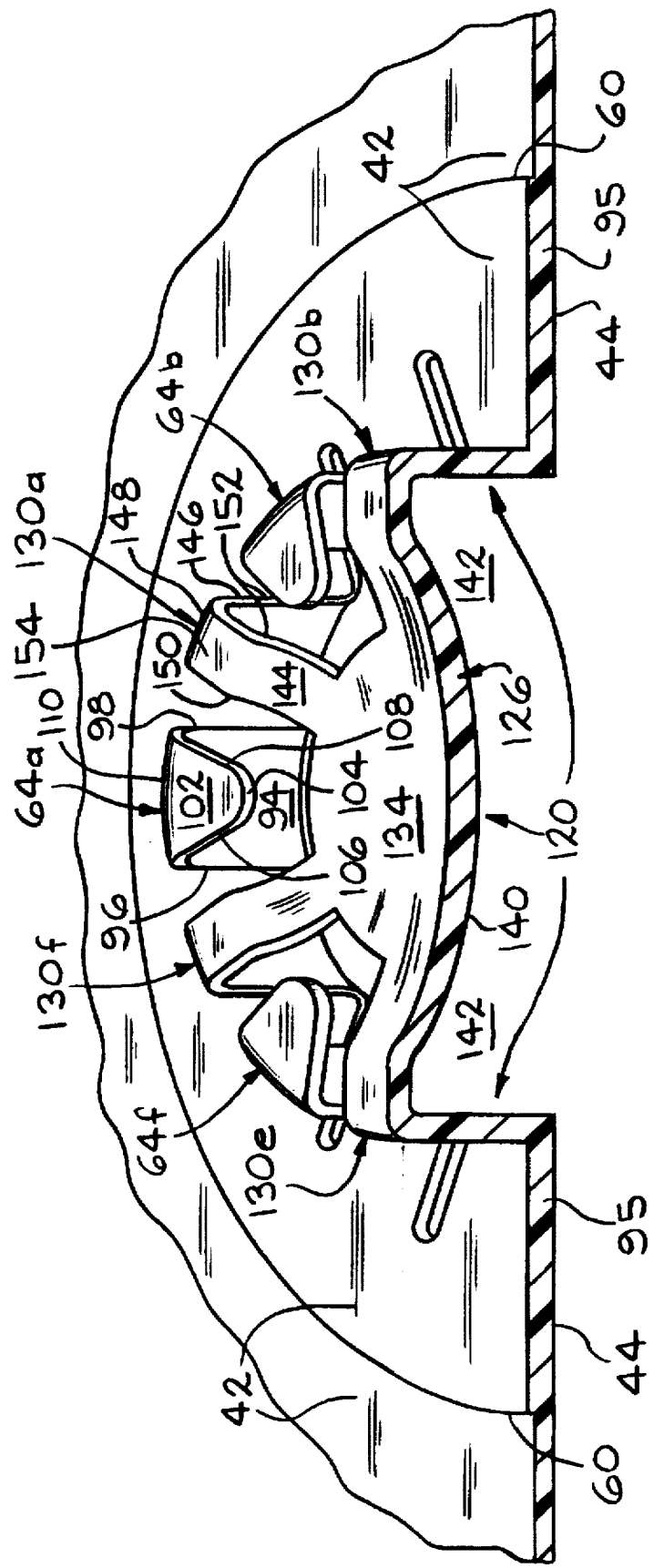
FIG. 6 is an enlarged fragmentary perspective view, partly in section, of the array of fingers and the impact resisting body in the compact disc tray structure according to the present invention.

Fingers 64a–64f are identical in structure, shape and size, and for convenience only one will be described, it being understood that the description applies equally to each of the fingers 64a–64f. Referring to FIG. 6 in conjunction with FIG. 3, a pair of radially inwardly extending slots 70 and 72 define the portion of the body of recess 30 from which finger 64a extends. Similar slots 74–92 are associated with corresponding ones of the fingers 64b–64f as shown in FIG. 3. Finger 64a has a first portion 94 extending upwardly from surface 42 of tray 14, in a direction generally perpendicular to the plane of the plate 95 defined between surfaces 42 and 44. Portion 94 is generally rectangular in shape, of the same thickness as the plate 95 and is disposed in a plane substantially normal to surface 42. Portion 94 is bounded by a pair of substantially mutually parallel side edges 96 and 98. Finger 64a includes a second portion 102 integral with first portion 94, of the same thickness as portion 94, and extending therefrom in a direction radially inwardly relative to the center of the circle defined by step 60. The finger second portion 102 is disposed in a plane substantially parallel to surface 42, and thus substantially parallel to the plate 95, and terminates in a finger tip 104 defined by inwardly directed side edges 106 and 108. The first 94 and second 102 portions of finger 64a meet at a shoulder 110.

Each of the other fingers 64b–64f is identical to finger 64a, having the same first and second finger portions meeting at a shoulder and having a tip at the inner termination of the finger. The plurality of finger tips are arranged in an annular array about the center reference of the circle defined by annular bead 60. The plurality of shoulders are arranged in an annular array about the perimeter of the annular arrangement of fingers 64a–64f. When a compact disc is fitted on tray 14, the annular array of shoulders receives the disc central opening in a snug fitting relation as will be described. This snug fit resiliently bends the fingers inwardly toward one another so that the disc is held firmly on tray 14 yet can be removed from the tray when it is desired to use the disc. Removal of the compact disc is facilitated by pushing the finger extension, i.e., portions 102, downwardly in a direction toward surface 42 of plate 95.

As previously described, tray 14 and the integral arrangement 62 of fingers is molded of thermoplastic material such as general purpose polystyrene which is relatively brittle. Thus, the fingers are subject to breakage when encountering impact forces which occur during automated installation of compact discs on the trays and placement of the tray in the package, upon dropping of the package including tray 14, or when heavy loads are stacked on the package during mail handling and the like. Therefore, in accordance with the present invention, tray 14 is provided with impact resisting shield means generally designated 120 in the central region of tray 14 within step 60 and in the region of the annular array 62 of fingers 64a–64f for receiving impact forces directed toward the fingers and for distributing the forces to the remainder of the tray 14, i.e. to the plate-like body of the tray, so as to protect the fingers from breakage upon impact. Shield means 120 is formed integrally with the plate-like body defining recess 30 during molding of tray 14 and comprises a central body portion or hub 126 and a plurality of radially outwardly extending portions in the form of tentacles or arms 130a–130f. As shown in FIG. 6, the central hub 126 has the overall shape of a disc and is located radially inwardly of the finger tips 104. Hub 126 is substantially the same thickness as the plate 95 defined between surfaces 42 and 44. As shown in further detail in FIGS. 3 and 4, the outer perimeter of hub 126 is located radially inwardly of the finger tips 104. The central body portion or hub 126 has a concave surface 134 facing toward the finger tips 104, i.e. in a direction outwardly relative to surface 42 of tray 14. In addition, hub 126 is located below finger extensions 102, i.e. in a plane between the planes of plate 95 and extensions 102. The location of hub 126 and its concave surface 134 allows room for the extensions 102 of fingers 64a–64f to be pressed downwardly, i.e. toward the plane of surface 42, without hinderance for easy release of a compact disc held by the array of fingers 64a–64f in a manner which will be described.

The central body portion or hub 126 of shield means 120 has an oppositely facing surface 140 which, as shown in FIGS. 4–6, is spaced from tray surface 42. Surface 140 is disposed in a direction opposite that of surface 134 and is convex in a direction toward the plane of plate 95. This arrangement defines a recess 142 to accommodate fitting in of the finger array of another tray. This, in turn, allows convenient stacking of a plurality of trays 14 when desired. In the tray 14 of the present invention there are six equally annularly spaced tentacles or arms 130a–130f extending from central body 126 and located between adjacent ones of the annularly spaced fingers 62a–62f. However, the particular number of radially outwardly extending arms 130 is a matter of design choice. Arms 130a–130f of the present illustration are identical in structure, shape and size, and for convenience only one will be described, it being understood that the description applies equally to each of the arms 130a–130f.

Referring to FIG. 6, arm 130a is a solid body of substantial the same thickness as hub 126 and which extends radially outwardly from central body portion 126 of the shield means and is located substantially equidistant between fingers 64a and 64b. Arm 130a has a first branch 144 extending radially upwardly and outwardly from hub 126 as viewed in FIG. 6 and a second branch 146 extending from branch 144 back to plate 95, the two branches meeting in a shoulder 148. Branch 146 is disposed substantially perpendicular to plate 95. Arm 130a is bounded by a pair of substantially mutually parallel side edges 150 and 152 each disposed in a plane substantially perpendicular to plate 95.

As shown in FIGS. 3 and 6 the thickness of arm 30a along both branches 144 and 146 is substantially the same as the thickness of plate 95 and is adequate for receiving and transmitting impact forces to the remainder of tray 14 exclusive of fingers 64a–64f. Branch 144 has an outer surface portion 154 adjacent shoulder 148 which is disposed substantially parallel to the plane of surface 42. Surface portion 154 is disposed in an annular plane spaced a small distance inwardly toward surface 42 in reference to the annular plane containing the outer surface of the finger portions 102 and finger tips 104.

Each of the other arms 130b–130f is identical to arm 130a, having the same thickness and being located substantially equidistant between corresponding fingers. Thus, arms 130a–130f radiate outwardly from the central hub 126 like spokes of a wheel and serve to transmit impact forces radially outwardly to the portion of tray 14 away from fingers 64.

The impact resisting shield means 120 in tray 14 according to the present invention serves to prevent breakage of fingers 64 due to impact forces imposed on tray 14. In particular, any impact forces directed to the central region of fingers 64 are received by central body or hub 126 and then are transmitted radially outwardly by the arms or tentacles 130 away from the array 62 of fingers and along the plate defined between surfaces 42 and 44 to the remainder of the tray 14. This diversion of impact forces away from the array 62 of fingers prevents finger breakage. Any forces acting on the finger portions 102 in a direction generally normal to the plane of tray surface 42 will deflect the fingers 64 only a relatively small distance whereupon the force will be received by the surface portions 156 of arms 130 and then transmitted away from the fingers. This is evident from an inspection of FIG. 4 wherein it is seen that the surface portions 102b and 102f of fingers 64b and 64f, respectively, are located only a relatively short distance outwardly of the surface portions 156b and 156e of arms 130b and 130e, respectively.

FIGS. 7 and 8 illustrate the manner in which a compact disc is placed on tray 14 of the present invention. A compact disc 170 having a central opening 172 is placed on tray 14 with opening 172 in registry with the annular array 62 of fingers as shown in FIG. 7. Disc 170 is urged toward surface 42 in the direction of arrows 176. The surface of disc opening 172 and the shoulders 110 are in a snug, sliding fit as shown in FIG. 7, and the fingers 64 are flexed inwardly in the direction of arrows 180. Disc 170 is moved further toward surface 142 until it rests on step 60 as shown in FIG. 8. In this position of disc 170 opening 172 is beyond the shoulders 110 whereupon the fingers 64 flex outwardly in the direction of arrows 182 and return to their initial positions. During the foregoing operation, there is no interference by the hub 126 and arms 130 of shield 120. The concave surface 134 accommodates inward flexing of fingers 64 during placement of disc 170 on the finger array. When it is desired to remove compact disc 170, the finger extensions 102 are pushed manually in a downward direction, i.e. toward surface 42, whereupon disc 170 is removed easily from the finger array.

Thus, the location of the impact resistance shield 120 which is below the finger extensions 102 and tips 104 together with the outwardly directed concave surface 134 of hub 126 allow the finger extensions 102 to be pressed downwardly for release of the compact disc 170. The location of the impact resistance shield above the plate 95 allows room for the finger array of another tray to be fitted therein so that a plurality of trays can be stacked on each other. If the shield 120 were positioned in the plane of the finger extensions 102 and finger tips 104, the finger extensions 102 could not be pressed downwardly for easy release of the compact disc 170. Also, if the shield 120 were positioned level with plate 95 there would be no recess or open region to facilitate stacking of trays.

Accordingly, the present invention provides an impact resistance shield 120 wherein the shape, structure and location of the hub 126 allows for the presence of such an impact resistance shield together with fingers 64 which have extensions 102 for the purpose of being pressed down to release the compact disc. In other words, the manner in which the impact resistance shield 120 is provided by the present invention is not incompatible with and does not interfere with or prevent downward movement, i.e. inward toward surface 42, of finger extensions 102. Furthermore, the shape or configuration of the impact resisting shield means 120 of the present invention provides a high degree of flexibility in the number of tentacles or arms 130 which can be employed. While six arms 130 are shown in the arrangement of the present illustration, as few as two arms 130 can be provided, and if desired many more than six arms can be employed. Thus a range of from a minimum of two arms 130 up to ten or more arms 130 will be effective in radiating impact energy to the plate body of tray 14 and serve as a buffer to the fingers 64.

FIGS. 9 and 10 illustrate an alternative embodiment of the present invention wherein the impact resisting shield means is located level with the plate-like body of the tray. In FIGS. 9 and 10 components which are identical to those of the embodiment of FIGS. 1–8 are identified by the same reference numerals with a prime designation. The shield means 190 of this embodiment includes a central hub 192 which is generally disc-shaped similar to hub 126 in the embodiment of FIGS. 1–8. Hub 192 is of substantially the same thickness as plate 95'. Shield means 190 includes a plurality of arms or tentacles 194 which extend radially outwardly from hub 192 and into the body of plate 95'. As in the embodiment of FIGS. 1–8, six arms 194 can be included, but as few as two can be employed. Each of the arms or tentacles 194 is in the form of an elongated rectangular strip and of substantially the same thickness of hub 192 and plate 95'. The impact resistant shield means 190 likewise functions to divert impact forces from the fingers 64' by radiating such forces outwardly to the body of tray 14' away from the fingers. The finger extensions 102' are pushed inwardly to release a compact disc in a manner identical to finger extensions 102 in the embodiment of FIGS. 1–8, and this is in no way hindered by the provision of shield means 190. The tray of the present invention can be made according to the embodiment of FIGS. 9 and 10 when it is not desired to have the central recess or open region to facilitate stacking of trays. The tray 14' according to the embodiment of FIGS. 9 and 10 has all of the other advantages and characterizing features of the tray according to FIGS. 1–8.

It is therefore apparent that the present invention accomplishes its intended objects. There is provided an impact resistant compact disc tray structure which prevents finger damage yet allows convenient and easy installation and removal of the compact discs.

While an embodiment of the present invention has been described in detail, that has been done by way of illustration, not limitation.

What is claimed is:

1. A tray for holding a circular recording media compact disc having a substantially circular central opening, said tray comprising:

a) a plate having a central region;

b) an annular array of fingers in said central region for receiving the disc central opening, said annular array of fingers including a plurality of shoulders arranged in an annular array having a diameter, each of said fingers including an extension disposed substantially parallel to said plate and bendable toward said plate and said extension having a surface portion extending substantially parallel to and facing away from said plate;

c) impact resisting shield means in said central region and in the region of said annular array of fingers for receiving impact forces directed toward said fingers and for distributing said forces to said plate so as to protect said fingers from breakage upon impact, said shield means being spaced from said finger extensions so that said finger extensions can be pushed in a direction toward said plate without interference by said shield means during removal of a compact disc from said tray, said shield means comprising a central body portion and a plurality of radially outwardly extending arm portions located between adjacent fingers and joining said central body portion to said plate, each of said arm portions having a shoulder thereby providing a plurality of shoulders arranged in an annular array having a diameter;

d) each of said radially extending arm portions of said shield means having a surface portion extending substantially parallel to said plate and said surface portions of said radially extending arm portions of said shield means being located a short distance closer to said tray than said surface portions of said finger extensions; and e) the diameter of said annular array of shoulders of said fingers being greater than the diameter of said annular array of shoulders of said arm portions of said shield means so that the disc central opening is contacted by said annular array of shoulders of said fingers and not by the arm portions of said shield means during receiving and removal of a compact disc.

2. The tray according to claim 1, wherein said fingers extend radially inwardly and terminate in an annular array of finger tips and wherein said central body of said shield means is located inwardly of said finger tips.

3. The tray according to claim 1, wherein said plate has a thickness and wherein said central body of said shield means has a thickness substantially equal to the thickness of said plate.

4. The tray according to claim 1, wherein said central body of said shield means has a concave surface facing in a direction away from said plate.

5. The tray according to claim 1, wherein said shield means is formed integrally with said plate.

6. The tray according to claim 1, in combination with a base and a cover hinged to said base to provide a package, said tray being received in said base.

7. The tray according to claim 1, wherein said finger extensions are disposed substantially in a plane and said central body portion of said impact resisting shield means is located between said plane and said plate.

8. A tray for holding a circular recording media compact disc having a substantially circular central opening, said tray comprising:

a) a plate having a substantially planar surface and a central region therein;

b) an annular array of fingers in said central region for receiving the disc central opening, each of said fingers having a first portion extending from said surface of said plate and a second portion extending in a plane substantially parallel to said surface of said plate, said first portion having a surface extending substantially parallel to and facing away from said plate, each of said finger second portions extending radially inwardly and terminating in a finger tip, said first and second portions of each of said fingers defining a shoulder which contacts the disc central opening in a snug fitting relation when the disc is held on said tray, there being a plurality of shoulders of said fingers arranged in an annular array having a diameter, and said second portions of each of said fingers being movable toward said plate to facilitate removal of the disc from the tray; and c) impact resisting shield means having a central body portion located in the region of said fingers and a plurality of radially outwardly extending arm portions located between adjacent fingers and joining said central body portion to said plate for receiving and distributing impact force in a manner protecting said fingers from breakage upon impact, each of said arm portions having a surface extending substantially parallel to said plate, said shield means being spaced from said finger second portions so that said finger second portions can be pushed in a direction toward said plate without interference by said shield means during removal of the compact disc from said tray;

d) said surface of each of said radially extending arm portions of said shield means being located a short distance closer to said tray surface than said surface portions of said fingers;

e) each of said radially outwardly extending arm portions of said shield means having a first branch extending outwardly from said central portion and a second branch extending upwardly from said plate, said first and second branches meeting in a shoulder thereby providing a plurality of shoulders arranged in an annular array having a diameter; and f) the diameter of said annular array of shoulders of said fingers being greater than the diameter of said annular array of shoulders of said arm portions of said shield means so that the disc central opening is contacted by said shoulders of said fingers and not by the arm portions of said shield means during holding and removal of a compact disc.

9. The tray according to claim 8, wherein said plate has a thickness and wherein said body of said shield means has a thickness substantially equal to the thickness of said plate.

10. The tray according to claim 8, wherein said central body of said shield means has a concave surface facing away from said plate.

11. The tray according to claim 10, wherein each of said radially outwardly extending portions of said shield means has a branch extending from said concave surface and upwardly inclined relative to said surface of said plate.

12. The tray according to claim 11, wherein said upwardly inclined branch of each of said radially outwardly extending portions of said shield means has an outer surface disposed substantially parallel to said plate surface.

13. The tray according to claim 8, wherein said central portion of said shield means is in the shape of a disc.

14. The tray according to claim 8, wherein said first portions of said fingers and said shield means define an open region to receive an annular array of fingers of another tray so that said trays can be stacked together.

15. The tray according to claim 8, in combination with a base and a cover hinged to said base to provide a package, said tray being received in said base.

16. The tray according to claim 8, wherein said central body portion of said impact resisting shield means is located between said plate and said plane in which the second portion of each of said fingers extends.

17. A tray for holding a circular recording media compact disc having a substantially circular central opening, said tray comprising:

a) a plate having a central region;

b) an annular array of fingers in said central region for receiving the disc central opening, said annular array of fingers including a plurality of shoulders arranged in an annular array having a diameter, each of said fingers including an extension disposed substantially parallel to said plate and bendable toward said plate; and c) impact resisting shield means in said central region and in the region of said annular array of fingers for receiving impact forces directed toward said fingers and for distributing said forces to said plate so as to protect said fingers from breakage upon impact, said shield means comprising a central body portion and a plurality of radially outwardly extending arm portions located between adjacent fingers and joining said central body portion to said plate, each of said arm portions having a shoulder thereby providing a plurality of shoulders arranged in an annular array of having a diameter; and d) the diameter of said annular array of shoulders of said fingers being greater than the diameter of said arm portions of said shield means so that the disc central opening is contacted by said annular array of shoulders of said fingers and not by the arm portions of said shield means during receiving and removal of a compact disc.

\* \* \* \* \*